Sept. 3, 1963    J. ANDERSON    3,102,622
CENTRIFUGAL FRICTION CLUTCHES
Filed Sept. 18, 1961
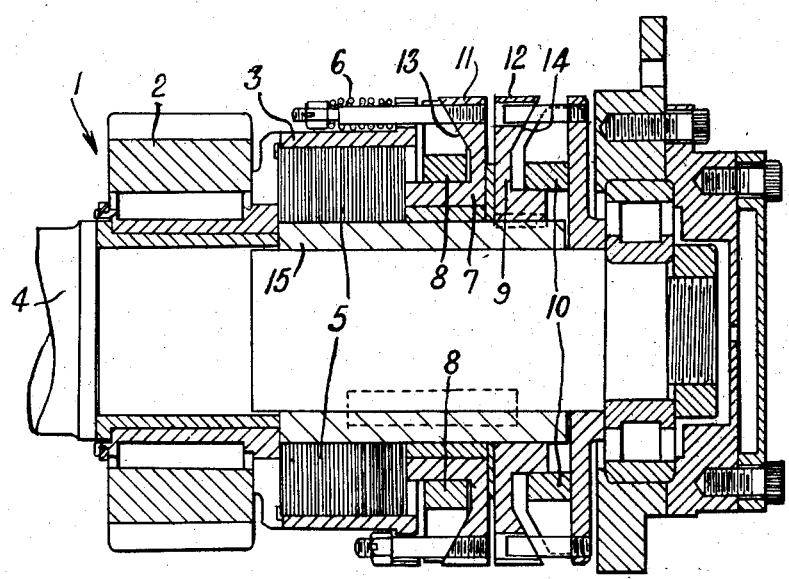

3,102,622
CENTRIFUGAL FRICTION CLUTCHES
James Anderson, Motherwell, Scotland, assignor to Anderson, Boyes & Company Limited, Motherwell, Scotland
Filed Sept. 18, 1961, Ser. No. 138,746
1 Claim. (Cl. 192—103)

This invention relates to improvements in centrifugal friction clutches.

In a friction clutch, according to the invention, driving and driven members arranged to be coupled by clutch plates have adjacent end faces movable into contact to transmit torque by spring means acting on an end plate, the end plate housing a set of weights arranged, during rotation of said end plate, to move under the influence of centrifugal force to urge the end plate in opposition to the influence of the spring means, and a second end plate housing a set of weights is arranged, during rotation of said end plate, to move under the influence of centrifugal force to urge said second end plate in the direction of influence of the spring means.

The accompanying drawing is an axial section of a friction clutch according to the invention.

Referring to the drawing, 1 denotes generally a driving member which comprises a gear wheel 2 and a cage 3 so mounted as to rotate on rotation of the gear wheel 2.

A driven member denoted generally by 4 is arranged to be coupled to the driving member 1 by clutch plates 5 which are alternately connected to a sleeve 15, which is keyed to the driven member 4, and to the cage 3. The clutch plates 5 which are connected to the cage 3 are movable by the action of spring means 6 acting on an end plate 7 into contact with the clutch plates 5 connected to the sleeve 15 to transmit torque from the driving member 1 to the driven member 4.

The end plate 7 houses a set of weights 8 arranged, during rotation of the end plate 7, to move under the influence of centrifugal force to urge the end plate 7 in opposition to the influence of the spring means 6.

A second end plate 9 which is keyed to the sleeve 15 houses a set of weights 10 arranged, during rotation of the end plate 9 to move under the influence of centrifugal force to urge the end plate 9 in the direction of the influence of the spring means 6.

The peripheral edge portions 11, 12 of the end faces of the end plates 7, 9 remote from one another are bevelled to present tapered faces 13, 14 against which the associated weights 8, 10 respectively abut during rotation of the driving and of the driven members 1, 4.

In practice, when both the driving and the driven members 1, 4 are stationary, the weights 8, 10 are disengaged from the associated tapered faces 13, 14 of the end plates 7, 9.

When the adjacent end faces of the clutch plates 5 are engaged to transmit the torque from the driving member 1 to the driven member 4, the end plates 7, 9 are rotated on rotation of the driving member 1. This rotation causes the weights 8, 10 to be urged by centrifugal force to abut on and to exert equal and opposite forces on the associated tapered faces 13, 14 of the end plates 7, 9. As the forces are equal and opposite, the weights have no effect on the clutch.

When rotation of the driven member 4 is stopped or retarded on account of overload and the member 1 continues to rotate, the clutch plates 5 slip, the weights 10 are disengaged from the associated tapered face 14, and, as the weights 8 associated with the end plate 7 continue to act on the associated tapered face 13, the effect of the spring means 6 on the end plate 7 is removed to permit the clutch plates 5 to move out of contact so causing the driving member 1 to become disengaged from the driven member 4.

In order to re-engage the driving member 1 with the driven member 4, rotation of both members 1, 4 must first stop to permit both sets of weights 8, 10 to become disengaged from the associated tapered faces 13, 14. This allows the clutch plates 5 to be re-engaged by the influence of the spring means 6. On rotation of the driving member 1 the driven member 4 is once more caused to rotate.

What is claimed is:

A friction clutch comprising driving and driven members, clutch plates mounted on said driving and driven members and movable into contact to transmit torque from said driving member to the driven member, spring means, an end plate operatively connected to said spring means and abutting said clutch plates whereby the spring means urges said clutch plates into engagement, a set of weights operatively associated with said end plate and adapted under the influence of centrifugal force to move said end plate in opposition to the influence of the spring means, a second end plate keyed to said driven member and operatively associated with said first end plate, and a second set of weights operatively associated with said second end plate and adapted under the influence of centrifugal force to move said second end plate in the direction of influence of said spring means, whereby when said driving and driven members are rotating at substantially the same rate the forces applied by said first and second sets of weights are counterbalanced and said spring means maintains the clutch plates in contact and when said driven member is retarded the force applied by said second set of weights is reduced and the force applied by said first set of weights overcomes the influence of the spring means and the clutch plates are disengaged.

References Cited in the file of this patent
FOREIGN PATENTS
674,600    Great Britain _____ June 25, 1952